United States Patent Office.

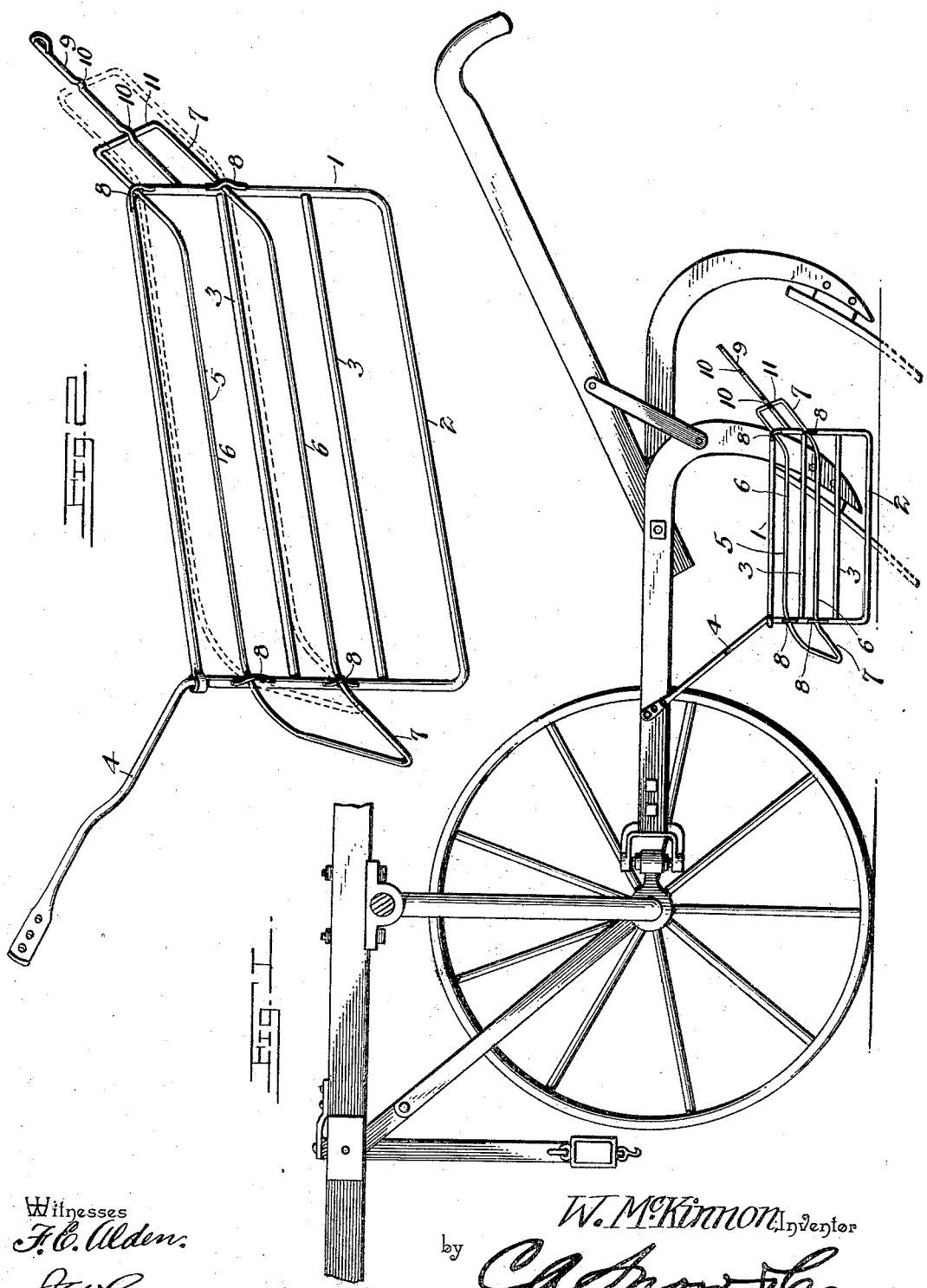

WILLIAM McKINNON, OF CHIPPEWA FALLS, WISCONSIN.

CULTIVATOR FENDER ATTACHMENT.

SPECIFICATION forming part of Letters Patent No. 688,877, dated December 17, 1901.

Application filed September 12, 1901. Serial No. 75,224. (No model.)

*To all whom it may concern:*

Be it known that I, WILLIAM MCKINNON, a citizen of the United States, residing at Chippewa Falls, in the county of Chippewa and State of Wisconsin, have invented a new and useful Cultivator Fender Attachment, of which the following is a specification.

My invention is an improved fender for cultivators to prevent the clods from falling on and injuring the growing plants; and it consists in the peculiar construction and combination of devices hereinafter fully described, and pointed out in the claims.

In the accompanying drawings, Figure 1 is a sectional view of a sulky-cultivator provided with my improved fender attachment. Fig. 2 is a detail perspective view of one of my improved fenders.

In the embodiment of my invention I provide a fender 1, which is here shown as an oblong frame 2, provided with a series of bars 3, which are appropriately spaced apart. At the front end of the fender 2, at the upper corner thereof, is an arm 4, the front end of which is adapted to be secured to the beam of a cultivator either by bolts or any other suitable means, the said arm 4 supporting the said fender at a suitable distance to one side of and abreast of the cultivator-shovel, as shown in Fig. 1. I also provide an adjustable frame or member 5, which is disposed on the outer side of the fender at a suitable distance from the upper side of the latter. The said adjustable frame may be of any suitable construction and is here shown as formed of a pair of adjustable bars 6, the ends of which project beyond the ends of the fixed fender-frame, being inclined and extended, as at 7, and supported in guides 8, with which the fender-frame is provided.

The relatively fixed fender-frame is provided at its rear end near its upper side with an inclined spring locking-arm 9, which has a series of notches 10. The adjustable frame is provided at its rear end with a member 11, which is adapted to engage either of the said notches 10, the said spring locking-arm and the said member 11 coacting to secure the adjustable frame at any desired adjustment. The space between the adjustable bars 6 equals the width of the space between one pair of the relatively fixed bars 3 of the fender. When the said adjustable frame is secured in its elevated position, (indicated by dotted lines in Fig. 2,) the bars thereof lie along one side of one pair of the fixed bars of the fender, so that the spaces between the said fixed bars of the fender are open to their widest extent. When the said adjustable frame is secured in its lowered position, (shown in full lines in Fig. 2,) the bars thereof are disposed midway between the fixed bars of the fender, so that the spaces between the bars of the fender are narrowed.

In operation my improved fender prevents the clods from falling on and injuring the young plants. The bars of the fender break up the clods which fall against them, thereby reducing the clods to small particles, which fall through the fender-bars and do no injury to the crop or plants which are being cultivated; but the said particles serve to cover and bury the weeds when the latter are small or are just starting through the soil, which is usually the case when corn is being plowed or cultivated for the first time, and thus the fender is useful not only in protecting the plants from injury, but also for destroying the young weeds.

It will be observed by reference to the drawings that the bars of my improved fender are horizontally disposed and that the same are effective in breaking up the clods that fall upon them, since a clod in falling against the fender will strike the bars successively and become broken at each impact.

Were the bars vertically disposed, a clod in falling against the fender would strike against a number of the bars at the same time and would not be so likely to be broken.

I do not desire to limit myself to the precise construction and combination of devices herein shown and described, as it is evident that modifications may be made therein without departing from the spirit of my invention.

Having thus described my invention, I claim—

1. A fender of the class described having fixed fender-bars, and an adjustable section having bars parallel with those of the guides and said adjustable section having obliquely-disposed supporting elements in said guides, whereby the bars of said adjustable section when the same is moved longitudinally are moved laterally with reference to the bars of said fender, substantially as described.

2. A fender of the class described having horizontally-disposed fixed fender-bars, and an adjustable section having bars parallel with said fixed fender-bars, substantially as described.

3. A fender of the class described, having bars spaced apart, in combination with an adjustable member having bars disposed in the spaces between the fixed bars, said adjustable member having inclined supports and said fender having guides for said inclined supports, substantially as described.

4. In combination with a fender having spaced bars, an adjustable member carried by said fender and having bars disposed in the spaces between the fender-bars, the said fender having a spring locking-arm to engage and secure the said adjustable member at any desired adjustment, substantially as described.

In testimony that I claim the foregoing as my own I have hereto affixed my signature in the presence of two witnesses.

WM. McKINNON.

Witnesses:
W. H. STAFFORD,
B. BREDESON.